Jan. 27, 1970
T. M. GOLDMAN ET AL
3,492,091
PRODUCTION OF AQUEOUS OR ANHYDROUS HYDROGEN CHLORIDE
FREE OF SULFUR DIOXIDE
Filed Aug. 2, 1967
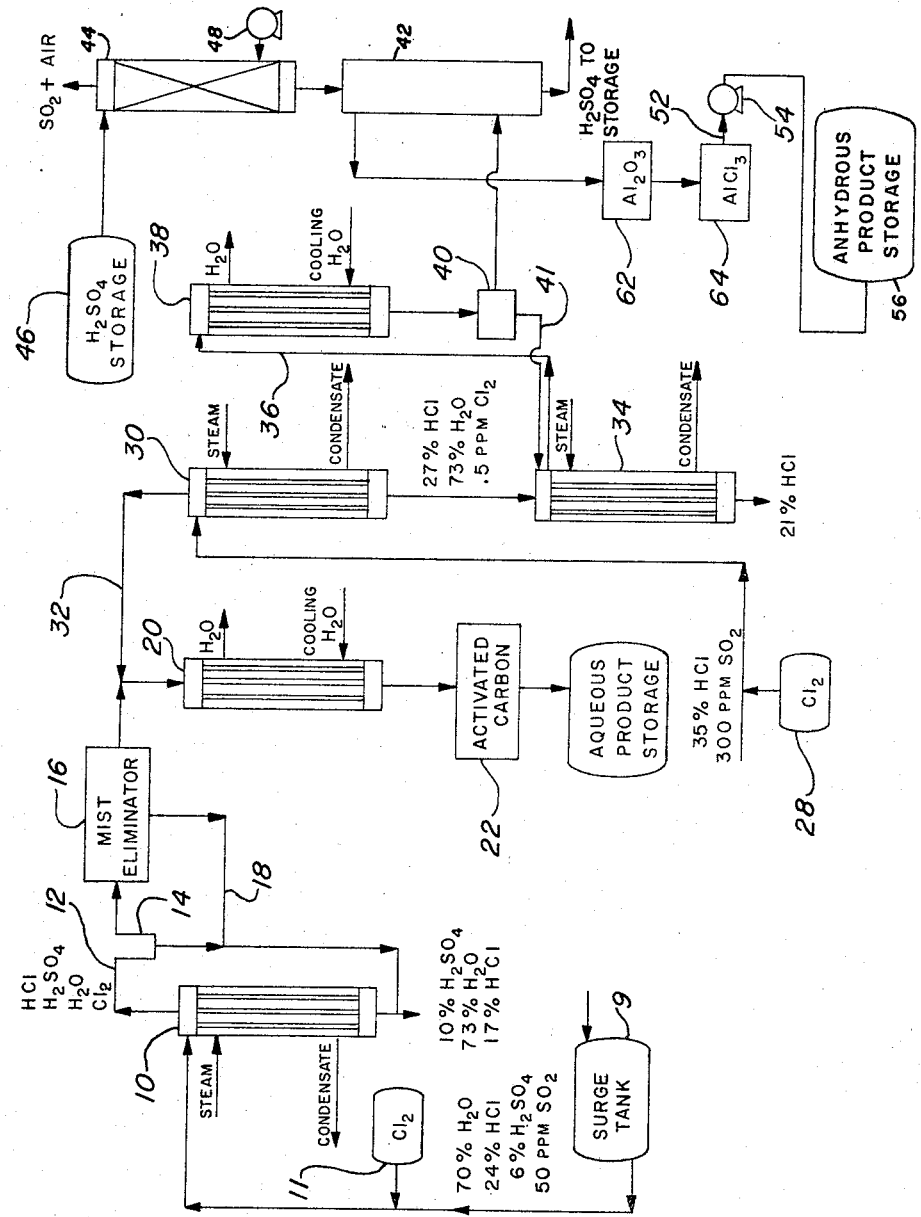
INVENTORS
THOMAS MILTON GOLDMAN
ROBERT LAMAR JORDAN
BY
ATTORNEY

United States Patent Office 3,492,091
Patented Jan. 27, 1970

3,492,091
PRODUCTION OF AQUEOUS OR ANHYDROUS HYDROGEN CHLORIDE FREE OF SULFUR DIOXIDE
Thomas Milton Goldman and Robert Lamar Jordan, Fort Worth, Tex., assignors to Stauffer Chemical Company, New York, N.Y., a corporation of Delaware
Filed Aug. 2, 1967, Ser. No. 657,979
Int. Cl. C01b 7/08
U.S. Cl. 23—154   4 Claims

ABSTRACT OF THE DISCLOSURE

An aqueous liquor containing HCl and $SO_2$ is treated with elemental chlorine, applied in stoichiometrical excess with respect to the $SO_2$ to oxidize the latter to $H_2SO_4$. Following separation of the $H_2SO_4$, the HCl product is treated to remove the excess chlorine.

---

This invention relates to a method for producing essentially sulfur-free aqueous and anhydrous hydrogen chloride.

The invention is particularly concerned with, but not limited to, the processing of HCl as derived from a Mannheim furnace. Such a furnace is normally fired with natural gas and is employed to achieve the reaction:

$$2KCl + H_2SO_4 \rightarrow K_2SO_4 + 2HCl$$

Incident to the reaction, some sulfur dioxide is also produced. As a consequence, the final HCl product whether aqueous or anhydrous, normally contains an appreciable amount of $SO_2$ as a contaminate. In many applications the $SO_2$ is acceptable, but in other areas even minute quantities are considered highly objectional. This is so, for example, among users of HCl for oil well acidizing. Also, there have been objections to the conventional anhydrous product from the electronic industry where anhydrous HCl is commonly used in etching of silicone insulating wafers.

Accordingly, the invention has as a principal object to provide a process whereby the $SO_2$ content of the HCl, whether aqueous or anhydrous, is reduced to a point rendering the product fully acceptable in the indicated areas of use.

A further object is to achieve such goal at minimal cost.

Still other objects and features of the invention will become apparent from the further description which will proceed with reference to the accompanying drawing diagrammatically illustrating a system adapted for the practice of the invention.

Although the particular system shown is designed to be integrated with, or interposed in, an existing assemblage of equipment adapted for the processing of vapors derived from a Mannheim furnace, its application is not to be taken as so restricted. However, a brief description of the processing which proceeds upstream of the illustrated system is believed in order. Suffice it to say, that the vapor effluent of the furnace is first subjected to adiabatic humidification with water and aqueous HCl to reduce the temperature thereof. Thereafter the vapors are scrubbed with weak aqueous HCl to remove entrained dust, consisting in the main of $K_2SO_4$ fines, and then absorbed in water which is conveyed to a surge tank along with the bottom product of the scrubbing unit.

In accordance with the invention (see drawing), the liquid from the surge tank 9, analyzing typically as indicated on the drawing, is fed to a stripper 10 in company with elemental chlorine (tank 11) applied in an amount greater than that required to oxidize the $SO_2$ to sulfuric acid in accordance with the equation:

$$SO_2 + 2H_2O + Cl_2 \rightarrow 2HCl + H_2SO_4$$

The bottom product of the stripper 10 consisting typically of 17 percent HCl, 10 percent $H_2SO_4$ and 73 percent $H_2O$ is applied in the scrubbing operation aforementioned.

The top product of the stripper 10 comprising HCl, $H_2O$ and $H_2SO_4$ is passed via a line 12 having a trap 14 therein to a mist eliminator 16. In the latter unit, substantially the last vestige of $H_2SO_4$ is removed. This aqueous acid, along with material derived from the trap 14, is conveyed to the bottoms line of the stripper 10 while the demisted aqueous HCl vapors are introduced into a condenser 20.

To remove the excess chlorine, i.e., the chlorine not consumed in the oxidation of the $SO_2$ content of the feed liquid to $H_2SO_4$, the aqueous HCl from the condenser 20 is passed through a bed of activated carbon 22. From the carbon bed, the essentially sulfur-free aqueous HCl product, normally containing about 35 percent HCl, is led to storage.

The right-hand portion of the drawing has relation to the production of essentially sulfur-free anhydrous HCl in accordance with the invention. It is contemplated that the material processed is derived from a system according with that above described except for the omission of the chlorine addition 11. In such case, the aqueous HCl product (from the aqueous product storage tank) contains typically 300 parts per million of $SO_2$. Such liquor is passed along with elemental chlorine admitted from the tank 28 to a stripper 30. Here again, the chlorine is used in stoichiometrical excess vis-a-vis the $SO_2$ content of the feed.

The overhead of the stripper 30 is fed via line 32 to the condenser 20, while the bottom product containing typically 27 percent HCl, 73 percent $H_2O$ and .5 p.p.m. $Cl_2$ is conveyed to a second stripper 34. From the latter there is derived as the bottom product an aqueous HCl solution containing of the order of 21 percent HCl. Such solution is passed to the surge tank 9 from which the stripper 10 is supplied.

The overhead from the stripper 34 is conveyed via a line 36 to a condenser 38 which connects with a separator 40. The liquid therein separated is passed to the stripper 34 via a line 41, while the wet HCl gas is conveyed to the bottom of a drying tower 42. Drying of the gas in such unit is accomplished with $H_2SO_4$ admitted from a stripper 44 served by an air blower 48. The function of the stripper 44, with blower 48, is to remove $SO_2$ from the $H_2SO_4$ derived from tank 46. By such means, the $SO_2$ content of the $H_2SO_4$ is normally reduced to about 1 p.p.m. The residual $Cl_2$ in the wet gas charged to the drying tower 42 is removed by reaction with the residual $SO_2$ in the $H_2SO_4$ from the stripper 44.

The substantially dried HCl gas from unit 42 is passed through desiccating units 62 and 64 respectively containing, as the desiccants, aluminum oxide and aluminum chloride. From the latter unit, the dry gas is conveyed via line 52 to a compressor 54, the output line of which leads to a storage tank 56.

The invention claimed is:

1. Method of producing essentially sulfur-free aqueous or anhydrous HCl from an aqueous liquor containing HCl and $SO_2$, said liquor being of industrial origin and containing the $SO_2$ in minute concentration expressed in parts per million, said method comprising treating said liquor with elemental chlorine applied in stoichiometrical excess with respect to the $SO_2$ content of the liquor, said treatment resulting in the oxidation of the $SO_2$ to $H_2SO_4$, and subsequently removing such $H_2SO_4$ and the excess chlorine from the HCl product.

2. Method of claim 1 where the aqueous liquor is derived by the absorption in water of the dedusted vapor effluent of a reactor applied to achieve the reaction:

$$2KCl + H_2SO_4 \rightarrow K_2SO_4 + 2HCl$$

3. Method according to either of the preceding claims where the excess chlorine is removed by means of activated carbon.

4. Method according to either of claims 1 or 2 where the excess chlorine is consumed by reaction thereof with $SO_2$ contained in $H_2SO_4$ employed in the drying of the HCl.

References Cited

UNITED STATES PATENTS

| | | | |
|---|---|---|---|
| 804,515 | 11/1905 | Askenasy et al. | 23—154 XR |
| 1,528,255 | 3/1925 | McKee | 23—154 XR |
| 1,781,830 | 11/1930 | Barstow | 23—154 XR |
| 2,165,784 | 7/1939 | Burrage | 23—154 |
| 2,196,246 | 4/1940 | Brown et al. | 23—154 |
| 2,301,779 | 11/1942 | Herold et al. | 23—154 XR |
| 2,316,633 | 4/1943 | Smith | 23—154 |
| 2,367,301 | 1/1945 | Mohr | 23—154 |
| 2,416,011 | 2/1947 | Latchum | 23—154 |
| 2,437,290 | 3/1948 | Bottenberg et al. | 23—154 |
| 2,762,689 | 9/1956 | Giraitis et al. | 23—154 XR |
| 3,192,128 | 6/1965 | Brandmair et al. | 23—154 XR |

FOREIGN PATENTS 1,041,433  9/1966  Great Britain.

EDWARD STERN, Primary Examiner

U.S. Cl. X.R.

23—121, 167